Oct. 12, 1937.  H. T. KRAFT  2,095,931

MEANS FOR REPAIRING SHEET AND TUBE MATERIAL

Filed June 17, 1935

INVENTOR
Herman T. Kraft
BY
Evans & McLoy
ATTORNEYS

Patented Oct. 12, 1937

2,095,931

UNITED STATES PATENT OFFICE 2,095,931

MEANS FOR REPAIRING SHEET AND TUBE MATERIAL

Herman T. Kraft, Akron, Ohio, assignor to The General Tire & Rubber Company, Akron, Ohio, a corporation of Ohio Application June 17, 1935, Serial No. 27,023

2 Claims. (Cl. 152—26)

This invention relates to means for repairing sheet material and more particularly to patches for repairing pneumatic tubes and means for applying the same.

One of the objects of the present invention is to provide a new and improved repair patch which is easy to apply and which will function to hold air within air containers such as inner tubes for pneumatic tires, even though the adhesive or cement may become ineffective as a securing means.

Another object is to provide a repair patch for repairing pneumatic tubes which is so constructed that it will yieldingly grip both sides of the tube material and close in the repaired opening.

A further object is to provide an improved repair patch of simplified construction and a simple means for applying the same.

With the above and other objects in view, the present invention consists of certain features of construction and combinations of parts to be hereinafter described with reference to the accompanying drawing and then claimed.

Referring to the accompanying drawing in which like numerals refer to like parts throughout the several views, the repair patch of the present invention is preferably made of a good grade of rubber and comprises a conical portion 1 having a shoulder 2 at its base and a neck portion 3 which terminates in a flange 4 spaced from the shoulder 2.

The length of the neck portion 3 may vary in accordance with the thickness of the tube or sheet material to be repaired and is preferably of a length which is slightly less than the thickness of the said material.

Figure 1:
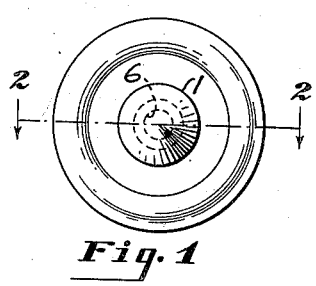
Figure 1 is a plan view of the repair patch of the present invention.
Figure 2:
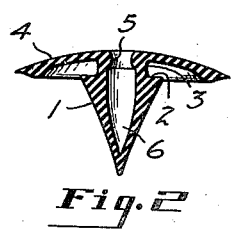
Fig. 2 is a section taken approximately on the line 2—2 of Fig. 1.

The flange 4 which is of a diameter substantially larger than the neck portion 3 is preferably dished toward the shoulder 2 as shown in Fig. 2.

Figure 4:
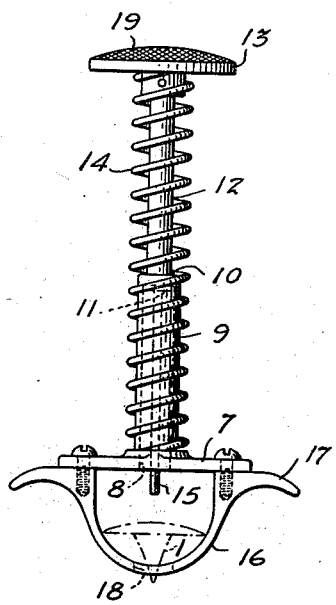
Fig. 4 is a side elevation of one form of patch applying means.

The patch is also provided with a central recess 6 which extends through the flange 4 and neck portion 3 and terminates within the conical portion near the apex thereof. The opening 6 is preferably provided with a narrow restraining bead 5 adjacent the flange 4, which bead is of smaller diameter than the maximum diameter of the recess 6. The patch applying tool shown in Figs. 4 and 5 comprises a plate 7 having an aperture 8 and a pair of spaced portions 9, one being at each side of the aperture 8, which portions 9 are connected together at their upper ends as shown in Fig. 4 by an apertured bridging portion 10. Slidably carried between the portions 9 is a plunger 11 having a portion 12 of reduced size which extends through the aperture of the bridging portion 10 and which is provided with a flanged head 13. A compression spring 14 surrounds the reduced portion 12 and spaced portions 9 and engages the plate 7 and head 13 to yieldably hold the plunger 11 against the bridging portion 10.

The plunger 11 is also provided with a rod portion 15 of smaller diameter than the patch recess 6, which rod portion projects through the plate aperture 8 as shown in Fig. 4.

The plate 7 carries an arched strip 16 having reversely curved finger engaging portions 17 at its ends. The arched strip 16 is formed with an aperture 18 in alignment with the aperture 8, the aperture 18 being of such size that the repair patch may be forced therethrough when stretched.

The surface of the head 13 may be provided with a number of sharp millings 19 which may be used to roughen the surface of the tube or sheet material surrounding the opening to be repaired.

Figure 3:
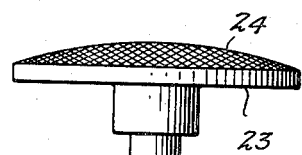
Fig. 3 is a sectional view showing the repair patch in its applied position within an opening in sheet or tube material to be repaired.
Figure 3:
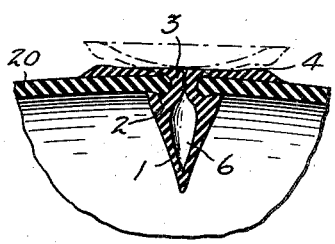
Figure 5:
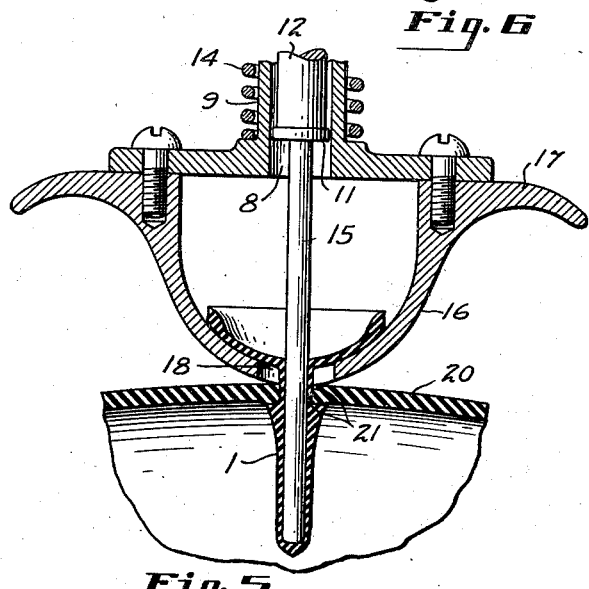
Fig. 5 is an enlarged fragmentary section of the applying means shown in Fig. 4, and showing the same in the act of applying the repair patch.

In repairing sheet or tube material such as the material 20 shown in Figs. 3 and 5 having an opening 21 therethrough, the surface of the material adjacent the opening is first roughened and a suitable rubber cement preferably applied thereto.

The patch plug is dipped in a suitable rubber cement and then mounted in the aperture 18 of the arched strip as shown in Fig. 4. The operator grasps the tool with his fingers engaging the portions 17 and his thumb engaging the head 13 and inserts the tip of the conical portion 1 which projects through the aperture 18 within the opening to be closed in. He then moves the head 13 towards the plate 7 against the pressure of the spring 14 which causes the rod portion 15 to extend to the bottom of the patch recess 6.

Upon continued movement of the head 13 the conical portion 1 is stretched and moved through the opening to be closed in, which stretches the opening 21 until it is cleared by the shoulder 2. During this operation the neck portion 3 is also stretched as shown in Fig. 5. As soon as the shoulder 2 has cleared the sheet or tube material the plate 7 is then moved towards the head 13, causing the flange 4 to be stretched and drawn through the aperture 18. The rod portion 15 is then withdrawn from the recess 6 and the tube or sheet material surrounding the neck portion 3 contracts and slightly compresses the neck portion 3, and, also, the neck portion 3 contracts to its normal length, causing the shoulder 2 and flange 4 to yieldingly grip the opposite sides of the tube or sheet material adjacent the opening which is closed in by the neck portion 3.

The flange 4 is then firmly pressed against the tube or sheet material, the cement being sufficiently tacky to provide for the desired adhesion.

Figure 7:
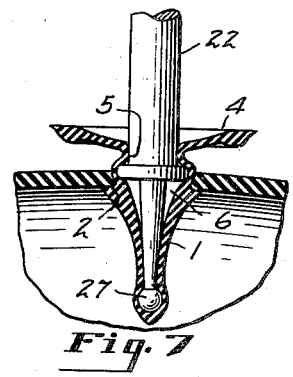
Fig. 7 is a fragmentary view showing the applying means of Fig. 6 in the act of applying the repair patch.
Figure 6:
Fig. 6 is an elevational view of a modified form of patch applying means.

In the modified construction shown in Figs. 6 and 7, the applying tool comprises a rod-like portion 22 having a head 23 thereon, which, as in the construction previously described, may be provided with a number of surface millings 24 for roughening the surface of the tube or sheet material. The opposite end of the rod portion 22 is provided with a flange 25 of increased diameter and with a coaxial tapering portion 26 which terminates in a ball-shaped or rounded end 27.

In using this tool the tapering portion is inserted within the recess 6 of the patch until it engages the bottom of the recess and then the patch is longitudinally stretched towards the head 24 until the bead 5 clears the flange 25 and seats against the face thereof, which faces the head 23. This elongates the conical portion 1 and neck portion 3 in the manner shown in Fig. 7. The repair patch is then dipped in a suitable rubber cement and when the cement is sufficiently tacky the conical portion is then forced through the opening to be repaired, which stretches the opening until the shoulder 2 of the repair patch clears the sheet or tube material, so that the shoulder 2 engages the lower side of the material as viewed in Fig. 7. The tool is then removed and the repaired tube or sheet material causes the neck portion 3 to be circumferentially compressed and also the neck portion 3 contracts to its normal length, causing the tube or sheet material to be yieldably gripped between the shoulder 2 and flange 4 of the repair patch.

After the tool is removed, the flange 4 is then firmly compressed against the tube or sheet material and is held in place by the cement or other adhesive.

One of the advantages of the repair patch of the present invention is that the patch will function to hold air within the tube or other pneumatic container even though the flange 4 may become loosened due to the loss of effectiveness of the securing cement through heat inasmuch as the neck portion 3 is yieldably gripped by the walls of the repaired opening, and the tube or sheet material surrounding the repaired opening is yieldably gripped by the shoulder 2 and flange 4 of the repair patch.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. An all-rubber sheet material repair plug, comprising a hollow, thick-walled conical portion having an apex, a flat shoulder forming the base of said conical portion and positively supported along its periphery by the wall of said conical portion, a substantially concave patch portion terminating along its periphery in a thin edge, a thick flange adjacent to and backing said thin edge, a hollow neck portion joining said conical portion with said patch portion and shorter than the thickness of said sheet material and of a diameter greater than that of the opening through which the neck portion is intended to extend but of materially less diameter than the base of said conical portion and apertured continuously thru said patch portion to adjacent the apex of said conical portion, and a restraining bead constricting said aperture at the junction of said patch portion with said neck portion.

2. A deformable all-rubber repair patch, comprising a concave patch portion having a beveled peripheral edge, a thick-walled conical portion provided with an opening extending from its base to immediately adjacent its apex and having as its base a flat shoulder of heavy stock positively supported along its periphery by the sides of said conical portion that are progressively thicker from the apex toward the base, and a hollow neck portion of a length substantially the same as the thickness of its wall portion and of an external diameter materially less than the external diameter of the base of said conical portion and connecting said conical portion to said patch portion, the base of said conical portion extending laterally outwardly from said neck portion and forming an abrupt shoulder at the end of the neck portion and serving to grip the material to be repaired between the base of said conical portion and said patch portion.

HERMAN T. KRAFT.